United States Patent

Furuta

[11] 4,096,527
[45] * Jun. 20, 1978

[54] RUN LENGTH ENCODING AND DECODING METHODS AND MEANS

[75] Inventor: Eiichiro Furuta, Ebina, Japan

[73] Assignee: Xerox Corporation, Stamford, Conn.

[*] Notice: The portion of the term of this patent subsequent to Nov. 1, 1994, has been disclaimed.

[21] Appl. No.: 726,866

[22] Filed: Sep. 27, 1976

[30] Foreign Application Priority Data

Sep. 29, 1975 Japan .................................. 50-117397

[51] Int. Cl.² ............................................... H04N 7/12
[52] U.S. Cl. ..................... 358/133; 358/260; 358/261; 358/262; 325/38 A; 178/68
[58] Field of Search ............. 325/38 A; 358/260, 261, 358/262, 133; 178/68; 340/347 DD

[56] References Cited

U.S. PATENT DOCUMENTS

| | | |
|---|---|---|
| 3,233,236 | 2/1966 | Katzenstein ....................... 325/38 A |
| 3,337,864 | 8/1967 | Lender ................................ 325/38 A |
| 3,502,806 | 3/1970 | Townsend ........................... 358/261 |
| 3,847,732 | 11/1974 | Perreault ................................ 178/68 |

Primary Examiner—Robert L. Richardson
Assistant Examiner—Edward L. Coles

[57] ABSTRACT

Black and white run length encoding means first convert a binary video input signal having a raster scan format into binary black and white run length message codes which are preselected so that the initial or lead bit of each of those codes is at a given logic level. Ternary encoding means convert the binary message codes into a series of ternary black and white run length message codes which have distinctive amplitude transitions at any intra-scan line code boundaries, and a modulator then converts the ternary codes into a frequency and phase modulated passband signal. To recover the video signal from the passband signal, the process is reversed.

7 Claims, 5 Drawing Figures

RUN LENGTH ENCODING AND DECODING METHODS AND MEANS

BACKGROUND OF THE INVENTION

This invention relates to run length encoding and decoding for raster scanned imaging systems and, more particularly, to methods and means for highlighting the baseband and passband boundaries between serial run length message codes of variable length.

Raster scanned imaging systems often are data rate limited. For example, conventional facsimile systems typically depend on limited bandwidth communications channels, such as are provided by the public switched telephone network. Accordingly, to increase the throughput of those systems, substantial effort and expense have been devoted to the development of data compression and decompression techniques for eliminating and then restoring the redundant information that is commonly found in video signals having a raster scan format — viz., signals comprising a predetermined number of serial picture elements for each of a plurality of successive, substantially equidistantly spaced scan lines. Of course, in facsimile systems, throughput is customarily expressed in terms of a document transmission time.

Others have recognized that run length encoding and decoding may be employed in digital raster scanned imaging systems for compressing and decompressing, respectively, binary video signals. In that context, a "run" is classically defined as being an uninterrupted series of picture elements of the same logic level. Thus, run length encoding is utilized to convert the white and/or black runs of a binary video signal having a raster scan format into corresponding run length message codes. Conversely, run length decoding is a complementary process for reconverting those message codes into white and/or black runs of the appropriate length to reconstruct the video signal.

As a general rule, the run length message codes are of variable length (i.e., bit count) to optimize, or at least increase, the data compression. Moreover, the run length message codes are usually serially fed from the encoder to the decoder. Consequently, others have addressed the problem of discriminating between run length message codes of variable length in a serial data stream.

More particularly, it has been suggested that flag codes be inserted into the data stream to separate the run length message codes. That is, however, counterproductive because the additional bits comprised by the flag codes detract from the increased throughput capability offered by the data compression. Another more sophisticated proposal is to employ mutually exclusive run length message codes so that each code is distinguishable from the prefixes of all other codes. That approach is taken in constructing what are commonly referred to as "Huffman codes", thereby acknowledging D. A. Huffman, "A Method for the Construction of Minimum — Redundance Codes", *Proceedings of the I.R.E.*, Sept. 1952, pp. 1098–1101. A mutually exclusive or Huffman-type code set has substantial merit, but the complexity of the code set rapidly increases as additional codes are added.

SUMMARY OF THE INVENTION

Against that background, an object of this invention is to provide relatively simple and reliable methods and means for discriminating in the baseband and passband between serial run length message codes of variable length. A more detailed, related object is to provide methods and means for imparting self-identifying baseband and passband intra-scan line boundaries to serial run length message codes of the foregoing type, without resorting to a mutually exclusive code set.

To carry out those and other objects of the present invention, there are black and white run length encoding means for converting a binary video input signal having a raster scan format into binary black and white run length message codes which are preselected so that the initial or lead bit of each of those codes is at a given logic level. Ternary encoding means convert the binary message codes into a series of ternary black and white run length message codes which have distinctive amplitude transitions at any intra-scan line code boundaries, and a modulator then modulates a carrier signal in accordance with the ternary codes to provide a phase and frequency modulated passband signal suitable for transmission over a limited bandwidth communications channel. To recover the video signal from the passband signal, the process is reversed.

BRIEF DESCRIPTION OF THE DRAWINGS

Still further objects and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with specific reference to a single exemplary embodiment, it is to be understood that there is no intent to limit it to that embodiment. On the contrary, the aim is to cover all modifications, alternatives, and equivalents falling within the spirit and scope of the invention as defined by the appended claims.

Figure 1:
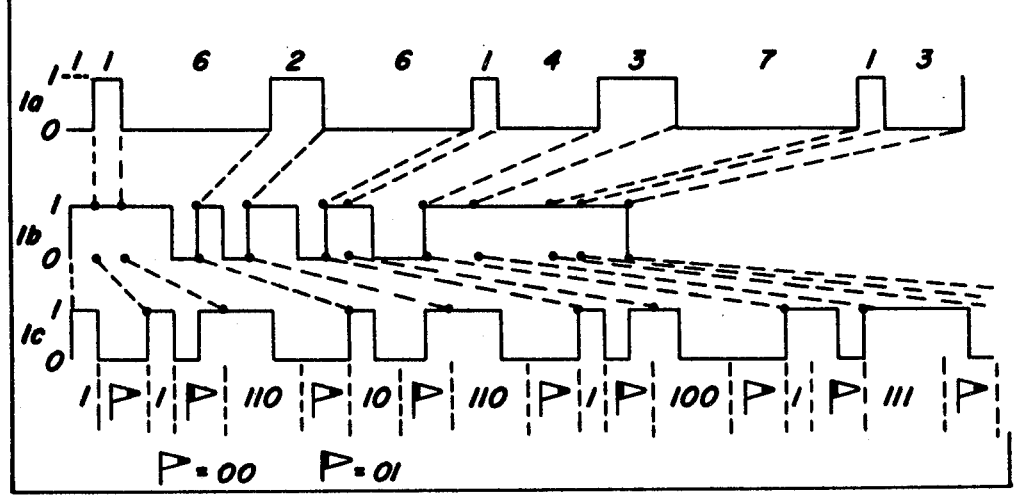
FIG. 1 illustrates a conventional run length encoding process requiring flag codes.

Turning now to the drawings, and at this point especially to FIG. 1, it is known that a binary video signal 1a having a raster scan format can be converted into a series of black and white run length message codes 1b through the use of a run length encoding process. However, if the message codes are of variable length, the boundaries of the successive codes must be clearly identified.

As previously mentioned, others have proposed that flag codes be inserted between the successive run length codes to identify the code boundaries. For example, white-to-black transitions and black-to-white transitions of the video signal 1a may be marked by inserting fixed length flag codes "00" and "01", respectively, between the message codes for the picture elements immediately proceeding and succeeding the transitions. The message codes are selected to exclude the bits patterns for the flag codes so that the alternating series of message codes and flag codes 1c is capable of being decoded to recover the video signal 1a.

Unfortunately, the flag codes incrementally increase the number of bits necessary to convey the video information as indicated by the following analysis of the encoding process shown in FIG. 1:

Table 1

| Color Represented | Run Length | Message Code | Flag Code |
|---|---|---|---|
| White | 1 | 1 | 00 |
| Black | 1 | 1 | 01 |
| White | 6 | 110 | 00 |
| Black | 2 | 10 | 01 |
| White | 6 | 110 | 00 |
| Black | 1 | 1 | 01 |
| White | 4 | 100 | 00 |
| Black | 3 | 11 | 01 |
| White | 7 | 111 | 00 |
| Black | 1 | 1 | 01 |
| White | 3 | 11 | 00 |

In this case, if the message code sequence 1111010110110011111111 is compared against the message code/flag code sequence 1001011100010011100001011000011011111001011100, it will be found that the addition of the flag codes doubles the number of bits in the serial data stream.

Figure 2:
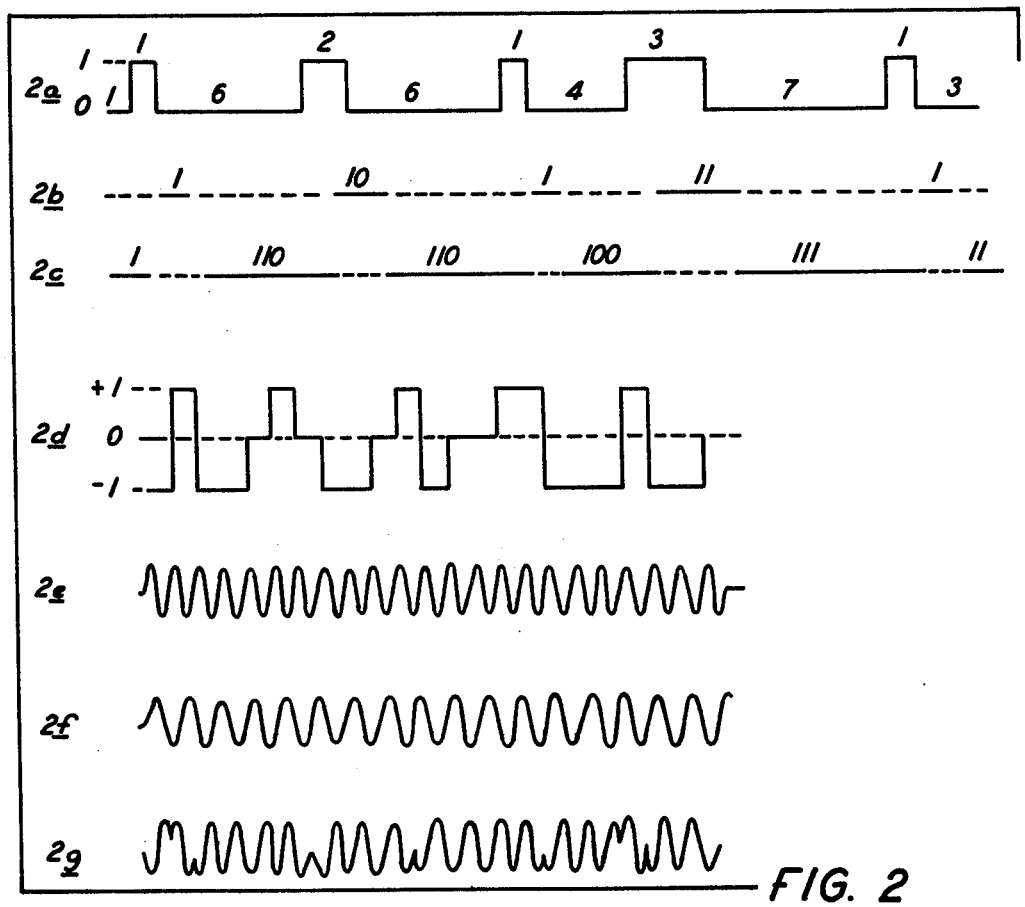
FIG. 2 illustrates a run length encoding process which takes advantage of the present invention.

Referring to FIG. 2, in accordance with this invention, black and white run length message codes are converted into ternary codes so that intra-scan line code boundaries are marked by distinctive amplitude transitions. As in other run length encoding processes, a binary video input signal 2a having a raster scan format is converted into corresponding black and white run length message codes 2b and 2c, respectively. The initial or lead bits of all of the message codes are selected to be at the same, say, high ("1") logic level, but otherwise the codes need only differentiate between runs of different length. Indeed, the message codes need not even distinguish between black and white runs because plural runs within a given scan line inherently alternate between black and white.

In keeping with the present invention, to serially generate a series of ternary black and white run length message codes 2d having distinctive amplitude transitions at the code boundaries, the bits of the binary message codes 2b and 2c are selectively level shifted relative to a predetermined reference level. More particularly, as shown, the initial bits and all other bits of like logic level (i.e., the high or "1" logic level bits) within the black message codes 2b are translated to a relatively positive level (+1). Conversely, the initial bits and all other bits of like logic level (again, the "1" bits) within the white message codes 2c are translated to a relatively negative level (−1). Furthermore, the other or low ("0") logic level bits of the black and white message codes 2b and 2c are translated to or maintained at a predetermined reference level (0). As a result, the baseband ternary codes 2d include positive-going polarity transitions to unambiguously identify white-to-black intra-scan line message code boundaries and negative-going polarity transitions to unambiguously identify intra-scan line black-to-white message code boundaries.

Moreover, to carry out this invention, carrier signals 2e and 2f of different frequencies are frequency shift-keyed and phase modulated in accordance with the ternary codes 2d to provide a frequency and phase modulated passband signal 2g for transmitting the ternary codes over a limited bandwidth transmission channel.

Figure 3:
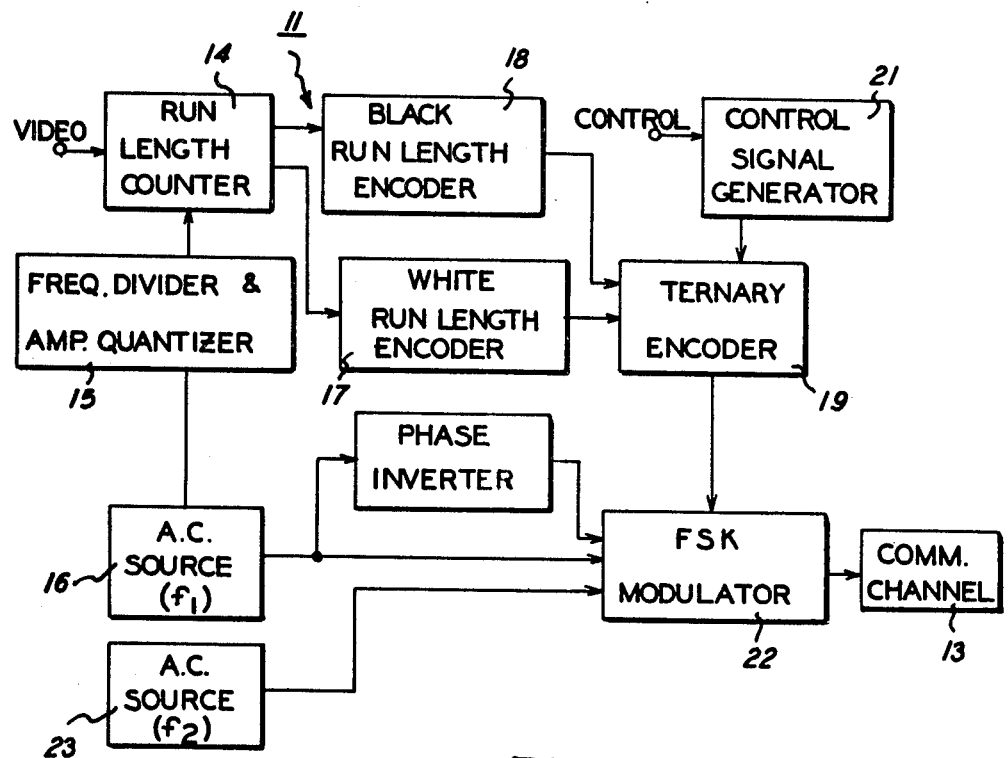
FIG. 3 is a simplified block diagram of a facsimile transmitting terminal including a run length encoder constructed in accordance with this invention.

Turning to FIG. 3, there is a facsimile transmitting terminal 11 (shown only in relevant part) which takes advantage of the above-described process to transmit the information content of a subject copy (not shown) to a remote receiving terminal 12 (FIG. 4) via a limited bandwidth communications channel 13.

In keeping with generally accepted practices, a binary video input signal representing the information content of the subject copy is applied to a run length counter 14 which is incremented at a predetermined rate by clock pulses and selectively reset to convert the runs of black (image representing) and white (background representing) picture elements within the video signal into corresponding counts. Specifically, the counter 14 is synchronously reset (by means not shown) as the scanning of the subject copy advances from scan line-to-scan line and asynchronously reset (by means also not shown) in response to each white-to-black and black-to-white intra-scan line transition of the video input signal. To provide the clock pulses for the counter 14, there suitably is a frequency divider and amplitude quantizer 15 for generating clock pulses in response to a first carrier frequency signal $f_1$ supplied by a first ac carrier signal source 16.

More or less conventional white and black run length encoders 17 and 18, respectively, are included to serially generate and temporarily store binary white and black run length message codes, respectively, in response to the counts provided by the run length counter 14. The first count for each scan line is applied to the white run length counter 17 in the expectation that at least the first picture element of each scan line will represent white, background information. Subsequent counts are, however, alternately routed so that the second count is applied to the black run length counter 18, the third to the white run length encoder 17, and so forth until the scanning advances to the next scan line. As will be appreciated, identical code sets may be used for encoding the black and white runs. It is, however, important that the code sets be selected to that the first bit of each binary message code is at a given logic level.

A ternary encoder 19 alternately reads the binary message codes provided by the white and black run length encoders 17 and 18 and selectively shifts the bits of those codes as previously described to generate a series of ternary white and black run length message codes having distinctive amplitude transitions at the intra-scan line code boundaries. The usual control signals (such as start-of-scan signals, end-of-line signals, synchronization pulses, and error detection signals) are inserted into the data stream before and after each scan line of encoded video by a control signal generator 21.

In accordance with the present invention, a frequency shift-keying (fsk) modulator 22 or the like is controlled by the ternary codes to provide a frequency and phase modulated passband signal for transmission to the receiving terminal 12 via the communications channel 13. Carrier signals of different predetermined frequencies $f_1$ and $f_2$ are supplied for the modulator 22 by the ac source 16 and another ac source 23, respectively. Furthermore, there is a phase inverter 24 coupled in a parallel path between the source 16 and the modulator 22 to supply another carrier signal of the same frequency $f_1$ as the first carrier signal but with opposite phase. The modulator 22, in turn, selectively gates or keys those carrier signals into the communications channel 13 to provide the passband signal. Specifically, the modulator 22 is keyed to pass one phase (say, the positive phase) of the carrier signal $f_1$ when the ternary codes are positive, the opposite or negative phase of the carrier signal $f_1$ when the ternary codes are negative, and the other carrier signal $f_2$ when the ternary codes are at the reference level. Intra-scan line code boundaries are, therefore, marked by distinctive phase transitions of the passband signal.

Figure 4:
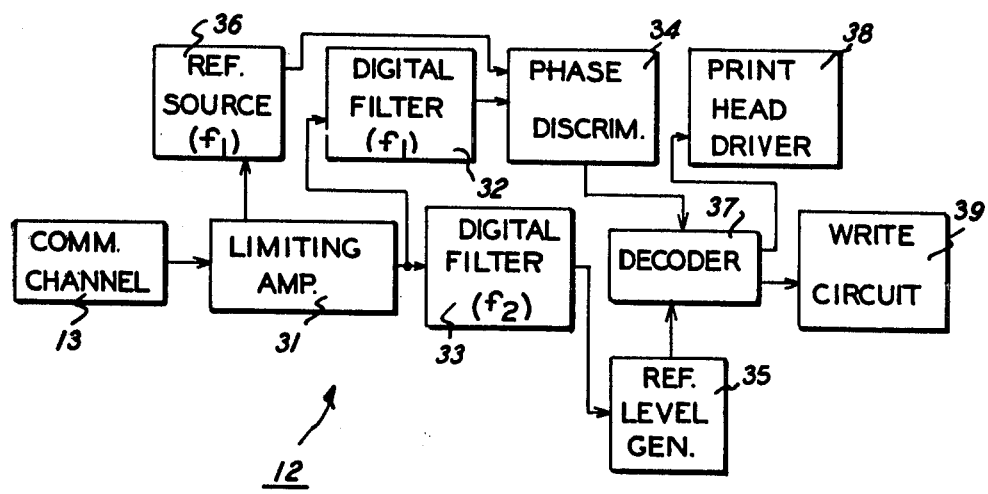
FIG. 4 is a simplified block diagram of a facsimile receiving terminal including a complementary run length decoder.

At the receiving terminal 12, as shown in FIG. 4, the passband signal is restored to a predetermined level by a limiting amplifier 31 and then fed to a pair of parallel digital filters 32 and 33. Those filters are centered at the carrier frequencies $f_1$ and $f_2$, respectively, so that passband signal components at the carrier frequencies $f_1$ and $f_2$ are selectively fed to a phase discriminator 34 and to a reference level generator 35. A reference source 36 is coupled to the phase discriminator 34 to provide a reference signal which is of the same frequency as and in phase with one (say, the positive) phase of the carrier signal $f_1$, whereby the phase discriminator 34 recovers the positive and negative components (+1 and −1) of the ternary codes. The reference level generator 35, on the other hand, responds to the other carrier signal $f_2$ to recover the reference level components (0) of the ternary codes.

The ternary codes are reassembled at a decoder 37, which typically goes through a ternary decoding process to recover the binary black and white run length codes and then a run length decoding process to reconstruct the binary video signal run length by run length. The binary video signal is applied to a print head drive circuit 38 and to a write circuit 39. The drive circuit 38 controls a motor (not shown) to translate the print head along successive scan lines of a suitable recording medium, and the write circuit 39 selectively actuates the print head in response to the video signal to print a replica or "facsimile" of the subject copy on the recording medium.

CONCLUSION

In view of the foregoing, it will now be understood that relatively simple and reliable methods and means have been provided for identifying the baseband and passband boundaries between serial run length message codes. Furthermore, it will be appreciated that the same message codes can, if desired, be used for black and white run length, thereby minimizing the number of members required to form a complete code set. Moreover, it will be understood that the presence of the distinctive passband phase/frequency transitions at the intra-scan line boundaries of the ternary codes reduces the risk of significant errors being introduced by transmission noise. Indeed, since black and white discriminative information is retained, there is virtually no risk of a run of one sense being inverted to appear as a run of the opposite sense.

What is claimed is:

1. In a limited bandwidth raster scanned imaging system including run length encoding means for converting a binary video signal having a raster scan format into binary black and white message codes, the improvement comprising ternary encoding means for selectively level shifting said binary message codes to provide a series of ternary black and white run length message codes having one polarity corresponding to initial bits of black message codes, another polarity corresponding to initial bits of white message codes, and a reference level corresponding to other bits of black and white run length message codes; and modulating means for supplying a passband signal which is frequency and phase modulated in accordance with said ternary codes.

2. The improvement of claim 1 wherein
    said binary run length message codes are of variable length, all of said binary message codes comprise at least an initial bit of a given logic level, and at least some of said binary message codes include at least one additional bit of an opposite logic level.

3. The improvement of claim 2 wherein said run length encoding means generate the same binary message codes in response to black and white runs, respectively, of the same length.

4. In a facsimile system for providing a facsimile copy of a subject copy in response to a binary video signal having a raster scan format; said system including a transmitting terminal, a receiving terminal, and a limited bandwidth communications channel for interconnecting said transmitting and receiving terminals; said transmitting terminal having run length encoding means for converting a binary video signal into binary black and white run length message codes; the improvement comprising ternary encoding means within said transmitting terminal for selectively level shifting said black and white message codes and for interleaving said message codes on a scan line-by-scan basis to provide a series of ternary black and white run length message codes having any intra-scan line code boundaries marked by distinctive amplitude transitions, modulating means within said transmitting terminal for phase and frequency modulating a passband signal in accordance with said ternary message codes to provide a passband signal for transmitting said ternary codes to said receiving terminal via said communications channel, and decoding means within said receiving terminal for recovering said video signal from said passband signal.

5. The improvement of claim 4 wherein
    said binary black and white run length message codes are of variable length and each includes at least an initial bit of a given logic level, and
    said ternary encoding means shifts bits of said black message codes which are at said given logic level to a first level of one polarity, bits of said white message codes which are at said given logic level to a second level of opposite polarity, and bits of said black and white message codes which are at an opposite logic level to an intermediate reference level, thereby creating distinctive amplitude polarity transitions at intra-scan line ternary code boundaries.

6. A method for converting a binary video signal having a raster scan format and including picture elements representing background areas and image areas into a data compressed passband signal, said method comprising the steps of converting runs of background representing picture elements within said video signal into binary white run length message codes, converting runs of image representing picture elements within said video signal into binary black run length message codes, interleaving said white and black run length message codes on a scan line-by-scan line basis, starting with a white run length message code for each scan line, selectively level shifting the interleaved white and black run length message codes to provide a series of ternary black and white run length message codes having distinctive amplitude transitions to identify intra-scan line code boundaries, phase and frequency modulating carrier signals in accordance with said ternary codes to provide a passband signal of one frequency but opposite phases in response to bits of one logic level from black and white message codes and of a different frequency in response to bits of an opposite logic level from said black and white message codes.

7. The method of claim 6 wherein said binary white and black run length message codes are of variable length, but each includes at least an initial bit of a given logic level;

said level shifting translates bits at said given logic level of said binary black run length message codes to a first level of one polarity, bits at said given logic level of said binary white run length message codes to a second level of opposite polarity, and any bits of said binary black and white run length message codes which are at an opposite logic level to a third, predetermined reference level intermediate said first and second levels, thereby providing distinctive amplitude transitions at the intra-scan line ternary code boundaries; and said passband signal is phase and frequency modulated to have one phase of a carrier signal having a first frequency in response to ternary message codes of said one polarity, an opposite phase of said first frequency carrier signal in response to ternary codes of said opposite polarity, and another carrier signal of a different frequency in response to ternary codes at said reference level.

* * * * *